United States Patent
Frank et al.

[15] 3,676,311
[45] July 11, 1972

[54] BURN-RESISTANT COMPOSITIONS CONTAINING A POLYTHIOL AND A PHOSPHONITRILIC POLYMER

[72] Inventors: Victor S. Frank, Silver Spring; Eldon E. Stahly, Ellicott City; Rip G. Rice, Ashton, all of Md.

[73] Assignee: W. R. Grace & Co., New York, N.Y.

[22] Filed: April 17, 1969

[21] Appl. No.: 817,186

[52] U.S. Cl.................204/159.14, 204/159.18, 260/2 P, 260/79, 260/79.1, 260/80 P, 260/80 PS, 260/471 R, 260/482 R, 260/543 P, 260/551 P, 260/561 P, 260/823, 260/874, 260/926, 260/927 N, 260/928
[51] Int. Cl...................B01j 1/00, C08g 23/00, C08g 33/00
[58] Field of Search.................204/159.14, 159.18; 260/2 P, 260/79, 79.1

[56] References Cited

UNITED STATES PATENTS 3,474,052  10/1969  Halasa et al. ........................260/3
3,459,838  8/1969  Klender..................................260/79

*Primary Examiner*—Murray Tillman
*Assistant Examiner*—Richard B. Turer
*Attorney*—Kenneth E. Prince

[57] ABSTRACT

Burn-resistant polymers are prepared by photocuring a mixture of polythiol and a phosphonitrilic polymer containing at least two reactive unsaturated carbon-to-carbon (ene) groups. The photocuring is achieved by exposing the mixture to ultraviolet light. The phosphonitrilic polymer containing at least two reactive ene groups is prepared by reacting a cyclic or linear phosphonitrilic chloride polymer, e.g., $(PNCl_2)_4$, with moieties containing reactive ene groups, e.g., allyl.

18 Claims, No Drawings

BURN-RESISTANT COMPOSITIONS CONTAINING A POLYTHIOL AND A PHOSPHONITRILIC POLYMER

BACKGROUND OF THE INVENTION

1. Objectives of the Invention

It is an object of this invention to provide a new burn-resistant polymer. Another object is to provide a process for preparing such burn-resistant polymer. Other objectives will be apparent to those skilled in the art from the following specification and claims.

2. Prior Art

The chlorine atoms in various polyphosphonitrilic chlorides have been replaced by alkoxy, aryloxy, hydroxy, amine and certain other radicals, respectively, by reaction with alkoxides, phenoxides and alcohols in the presence of organic bases, on treatment with water, amides, amines, urea derivatives, mercaptans and certain other reagents. If unsaturated alkoxy groups, e.g., allylic, are introduced into the low-molecular-weight phosphonitrilic chlorides, the resulting substances polymerize easily at the double bonds which exist in the molecule. If the chlorine atoms are replaced by alkoxy, aryloxy, alkyl or aryl groups, the chemical stability of the polymers is greatly improved.

Dishon, B., *J. Am. Chem. Soc.*, 71, 2251 (1949), discloses preparing $[(C_4H_9O)_2NP]_3$ by adding butyl alcohol at 0°C. to a solution of $(NPCl_2)_3$ in pyridine. The dibutyl ester, when isolated, polymerized easily to a highly viscous oil. Cyclic $(PNCl_2)_3$ was reacted with $Me_2NH$ to yield $[PNCl(NMe_2)9_3$ at page 260 of Shaw, R. A., et al., *Chem. Review* (1962). $N_3P_3Cl(NH_2)_2$; $N_3P_3Br_4(NH_2)_2$; $N_3P_3(NH_26$; $N_4P_4(NH_2)_8$ and various other ammonolysized compounds of $(NPCl_2)_n$ are known, see, for example, page 263 of Shaw, R. A., et al., *Chem. Review* (1962). At pages 263 to 266 in the same reference, reactions of primary and secondary amines with $(NPCl_2)_3$ to yield $N_3P_3Cl_{6-y}(NR'R'')_y$, where $y$ is 1 to 6, are disclosed. Typical products are $N_3P_3(NHMe)_6$ and $N_4P_4Cl_7NMe_2$. At page 268 of the same reference, $(PN(OR)_2)_3$ and $(PN(OR)_2)_4$ are prepared by the reaction of alcohols with the polyphosphonitrilic chlorides in the presence of pyridine. Compounds of the type $(RS)_6P_3N_3$, where R is a group, such as, an ethyl or phenyl group, have been reported. The reported compounds were liquids. Hexathiophenoxytriphosphonitrile has been prepared. It melts at 145° to 149°C. and readily polymerized when heated. The following polymer is reported; (but its identity and authenticity has been questioned in the literature):

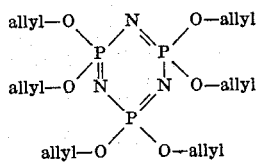

BROAD DESCRIPTION OF THE INVENTION

This invention involves a process for preparing a burn-resistant polymer. The process includes preparing a photocurable mixture by admixing a polythiol containing at least two thiol groups per molecule, and a phosphonitrilic polymer containing at least two reactive unsaturated carbon-to-carbon (ene) groups. The sum of the functionalities of the polythiol and the phosphonitrilic polymer must be at least four. The process further includes curing the mixture. The cure can be achieved by exposing the photocurable mixture to actinic radiation containing a substantial amount of ultraviolet radiation. (The photocure is speed by the inclusion of a photocuring rate accelerator.) The mixture can also be cured by means of laser beams, electron beams, gama rays, and other process of radiant energy. The mixture can be cured by means of included peroxides or hydroperoxides, whether or not accelerated, iron and dioxime esters, azo compounds etc. So the curing can be achieved by radiant or chemical means. The curing converts the components to a solid burn-resistant polymer.

The process also included the step of converting a phosphonitrilic halide polymer into said phosphonitrilic polymer containing at least two reactive ene groups. Preferably a phosphonitrilic chloride polymer is used, and even more preferably, a phosphonitrilic chloride polymer is used. Typically, the phosphonitrilic polymer containing at least two reactive ene groups is formed by reacting a cyclic phosphonitrilic chloride polymer with a secondary amine containing at least one reactive ene group or a primary amine containing a reactive ene group.

This invention also includes the burn-resistant polymer formed by curing (particularily, by exposure to actinic radiation containing substantial amounts of ultraviolet radiation) an admixture of a polythiol containing at least two thiol groups per molecule and a phosphonitrilic polymer containing at least two reactive ene groups per molecule. The sum of the functionalities of said polythiol and said phosphonitrilic polymer containing more than two reactive ene groups must be at least four.

DETAILED DESCRIPTION OF THE INVENTION

The ingredients necessary to prepare a photocurable composition which is burn-resistant are:

1. 2 to 98 parts by weight of a polythiol containing at least two thiol groups per molecule; and
2. 98 to 2 parts by weight of a phosphonitrilic polymer containing at least two groups having reactive unsaturated carbon-to-carbon bonds.

As used herein, the term "polythiols" refers to simple or complex organic compounds having a multiplicity of pendant or terminally positioned —SH functional groups per average molecule. On the average, the polythiols must contain two or more —SH groups/molecule. They usually have a viscosity range of slightly above 0 to about 20 million centipoises (cps.) at 70°C., as measured by a Brookfield Viscometer. Included in the term "polythiols" as used herein are those materials which in the presence of an inert solvent, aqueous dispersion or plasticizer fall within the viscosity range set out above 70°C. Operable polythiols in the instant invention usually have molecular weights in the range of about 50 to about 20,000, preferably about 100 to about 10,000. The polythiols operable in the instant invention can be exemplified by the general formula: $R_8 —(SH)_n$ where n is at least 2 and $R_8$ is a polyvalent moiety free from "reactive" carbon to carbon unsaturation. Thus $R_8$ may contain cyclic groupings and amounts of hetero atoms, such as, N, S, P or O but usually contains carbon-hydrogen, carbon-oxygen, or silicon-oxygen containing chain linkages free of any "reactive" carbon-to-carbon unsaturation.

One class of polythiols operable with polyenes in the instant invention to obtain essentially odorless photo-cured polythioether compositions are esters of thiol-containing acids of the general formula: $HS—R_a—COOH$ where $R_a$ is an organic moiety containing no "reactive" carbon-to-carbon unsaturation with polyhydroxy compounds of the general structure: $R_b —(OH)_n$ where $R_b$ is an organic moiety containing no "reactive" carbon-to-carbon unsaturation and n is 2 or greater. These components will react under suitable conditions to give a polythiol having the general structure:

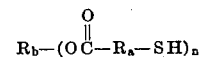

where $R_a$ and $R_b$ are organic moieties containing no "reactive" carbon-to-carbon unsaturation and n is 2 or greater.

Certain polythiols, such as, the aliphatic monomeric polythiols (ethane dithiol, hexamethylene dithiol, decamethylene dithiol, tolylene-2,4-dithiol, etc.) and some polymeric polythiols, such as, a thio-terminated ethylcyclohexyl dimercaptan polymer, etc. and similar polythiols which are conveniently and ordinarily synthesized on a commercial basis, although having obnoxious odors, are operable in this invention. Examples of the preferred polythiol compounds (because of their relatively low odor level and fast curing rate) include esters of thioglycolic acid (HS—CH$_2$COOH), -mercaptopropionic acid (HS—CH(CH$_3$)—COOH) and -mercaptopropionic acid (HS—CH$_2$CH$_2$COOH) with polyhydroxy compounds, such as, glycols, triols, tetraols, pentaols, hexaols, etc. Specific examples of the preferred polythiols include ethylene glycol bis(thioglycolate), ethylene glycol bis($\beta$-mercaptopropionate), trimethylolpropane tris(thioglycolate), trimethylolpropane tris ($\beta$-mercaptopropionate), pentaerythritol tetrakis(thioglycolate) and pentaerythritol tetrakis ($\beta$-mercaptopropionate), all of which are commercially available. Another specific example of a preferred polymeric polythiol is polypropylene ether glycol bis($\beta$-mercaptopropionate) which is prepared from polypropylene-ether glycol (e.g. Pluracol P2010, Wyandotte Chemical Corp.) and $\beta$-mercaptopropionic acid by esterification.

The preferred polythiol compounds are characterized by a low level of mercaptan-like odor initially, and after reaction, give essentially odorless photocured end products.

As used herein the term "odorless" means the substantial absence of the wall-known offensive and sometimes obnoxious odors that are characteristic of hydrogen sulfide and the derivative family of compounds known as mercaptans.

As used herein, a reactive ene group is a group containing a reactive unsaturated carbon-to-carbon bond. So a phosphonitrilic polymer containing groups having at least two reactive unsaturated carbon-to-carbon bonds is also termed "a phosphonitrlic polymer containing ene groups." The reactive carbon-to-carbon bonds are preferably located terminally, near terminally, and/or pendant from the main chain of the moiety which replaced the halide or chlorine atoms on the phosphonitrilic polymer. As used herein, the term "ene" encompasses "reactive" carbon-to-carbon double bonds and "reactive" carbon-to-carbon triple bonds. Combinations of "reactive" double bonds and "reactive" triple bonds within the same molecule are operable. As used herein, the term "reactive unsaturated carbon-to-carbon groups" means groups which will react under proper conditions as set forth herein with thiol groups to yield the thioether linkage

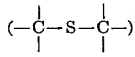

as contrasted to the term "unreactive" carbon-to-carbon unsaturation which means

groups when found in aromatic nucleii (cyclic structures exemplified by benzene, pyridine, anthracene, tropolone and the like) which do not under the same conditions react with thiols to give thioether linkages.

As used herein for determining the position of the reacive functional carbon-to-carbon unsaturation, the term "terminal" means that said functional unsaturation is at an end of the main chain in the molecule; whereas by "near terminal" is meant that the functional unsaturation is at an end of the main chain in the molecule; whereas by "near terminal" is meant that the functional unsaturation is not more than 16 carbon atoms away from an end of the main chain in the molecule. The term "pendant" means that the reactive carbon-to-carbon unsaturation is located terminally or near terminally in a branch of the main chain as contrasted to a position at or near the ends of the main chain. For purposes of brevity, all of these positions will be referred to generally as "terminal" unsaturation.

Operable phosphonitrilic polymers contain at least two reactive ene groups consisting of one or more of the following types of non-aromatic and non-conjugated "reactive" carbon-to-carbon unsaturation:

(1) —CH=CH—   (5) —C=C—
                    |  |
(2) —CH=C—    (6) —C=CH—

(3) —CH=CH$_2$   (7) —CH=C—
                          |
(4) —C=CH     (8) —C=CH$_2$
                         |

These functional groups as shown in 1-8 supra are situated in a position either which is pendant, terminal or near terminal with respect to the main chain but are free of terminal conjugation. As used herein, the phrase "free of terminal conjugation" means that the terminal "reactive" unsaturated groupings may not be linked directly to non-reactive unsaturated species, such as,

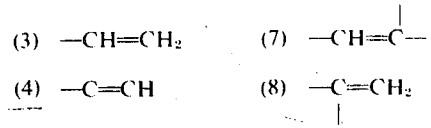

and the like, so as to form a conjugated system of unsaturated bonds exemplified by the following structure:

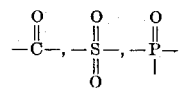

The phosphonitrilic polymers containing at least two reactive ene groups are prepared from phosphonitrilic halide polymers or polyphosphonitrilic halides. The chloride forms are the preferred polymers, as are the cyclic forms.

Examples of polyphosphonitrilic chlorides which are useful as starting materials are (PNCl$_2$)$_3$, m.p. = 114°C.; (PNCl$_2$)$_4$, m.p. = 123.5°C.; (PNCl$_2$)$_5$, m.p. = 40.5° to 41°C.; (PNCl$_2$)$_6$, m.p. = 90° to 91°C.; (PNCl$_2$)$_7$, m.p. = 8° to 12°C.; (PNCl$_2$)$_8$, m.p. = 57° to 58°C.; (PNCl$_2$)$_{11}$; etc. The mixture of (PNCl$_2$)$_3$ and (PNCl$_2$)$_4$, containing 60 to 70 mole percent of the trimer, has a m.p. of 88.5° to 89°C. and is also useful. This invention also encompasses the use of other polyphosphonitrilic halides and mixed halides, such as, (PNF$_2$)$_3$, m.p. = 27.8°C; (PNF$_2$)$_4$, m.p. = 30.4°C.; P$_3$N$_3$Cl$_2$F$_4$; P$_3$N$_3$ClF$_5$; P$_4$N$_4$Cl$_2$F$_6$, m.p. = 21°C; (PNBr$_2$)$_3$, m.p. = 191.5°C; P$_3$N$_3$BrCl$_5$, m.p. = 123°C; P$_3$N$_3$Br$_2$Cl$_4$, m.p. = 132°C.; P$_3$N$_3$Br$_4$Cl$_2$, m.p. = 168°C.; P$_4$N$_4$Br$_8$, m.p. = 202°C.; P$_4$N$_4$FCl$_7$, m.p. = 63°C.; P$_4$N$_4$F$_3$Cl$_5$, m.p. = 10°C.; P$_4$N$_4$F$_5$Cl$_3$, m.p. = −28°C.; (PNFCl$_4$), m.p. = 23°C.; P$_4$N$_4$F$_2$Cl$_6$, m.p. = 23°C.; P$_4$N$_4$F$_5$Cl, m.p. = −5°C.; (PNF$_2$)$_5$, m.p. = −50°C.; (PNF$_2$)$_6$, m.p.= −45.5°C.; (PNF$_2$)$_7$, m.p. = −61°C.; (PNF$_2$)$_8$, m.p. = −17°C.; (PNF$_2$)$_9$, m.p. = −78°C.; (PNF$_2$)$_{10}$, m.p. = −51°C.; (PNF$_2$)$_{11}$, m.p. = −78°C.; etc. Mixtures of the various materials can be used as starting materials in preparing the phosphonitrilic polymers having at least two reactive ene groups.

The cyclo phosphonitrilic chlorides, (PNCl$_2$)$_y$, where y varies from 3 to 17, are polymeric. The phosponitrilic chlorides are prepared by the reaction of phosphorus nitrides with chlorine, by heating phosphorus pentachloride with solid ammonium chloride at 145° to 160°C., or by other methods well known to those skilled in the art. A method for preparing an admixture of (PNCl$_2$)$_3$, 75 percent, and (PNCl$_2$)$_4$, 25 percent, and separating the components, is given on page 229 of Gefter, E. L., *Organophosphorus Monomers and Polymers*, Associated Technical Services, Inc., New Jersey (1962).

X[PNX$_2$]$_y$PX$_4$, where y equals one to 500 and x is a halogen atom, is the general formula for the series of linear polyphosphonitrilic halides. Examples of Cl[PNCl$_2$]$_y$PCl$_4$ are Cl$_3$P = NPCl$_4$; Cl$_3$P = NPCl$_2$ = NPCl$_4$; Cl$_3$P = NPCl$_2$ = NPCl$_2$ = NPCl$_2$; Cl[PNCl$_2$]$_4$; Cl[PNCl$_2$]$_6$ PCl$_4$; Cl[PNCl$_2$]$_8$PCl$_4$; Cl[PNCl$_2$]$_{10}$PCl$_4$; Cl[PNCl$_2$]$_{15}$PCl$_4$; etc.

It should be noted that linear polymers which have the formula:

Cl$_3$PN(PNCl$_2$)$_y$PCl$_4$ are probably in the following form:

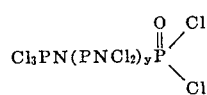

after even very brief exposures to atmospheric oxygen, moisture, etc. The ene substitution on the ends of the linear polymer is fairly limited to the remaining chlorine atoms (halide atoms).

This invention broadly covers the use of phosphonitrilic polymer containing at least two reactive ene groups to make burn-resistant polymers by photocuring that polymer and a polythiol. This invention also covers the step in conjunction with the above, whereby polyphosphonitrilic halides are converted to the phosphonitrilic polymer containing at least two reactive ene groups. There are many ways to perform the conversion step, and the more useful ways are presented in the following paragraphs.

Cyclic and linear polyphosphonitrilic chloride and alcohols having reactive ene groups in an solvent, such as, pyridine, etc., can be refluxed to produce olefinic derivatives of the polymer. The overall reaction is broadly shown as:

$(PNCl_2)_y$ + excess ROH $\xrightarrow{pyridine}$ $[PN(OR)_2]_y$ + $(2y)HCl$ where R is an alkenyl group. (As used herein, the term alkenyl group includes alkynyl groups.) An excess of alcohol should be used. A specific example is:

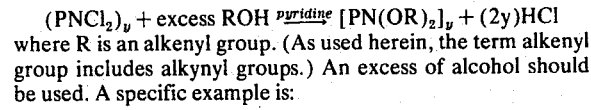

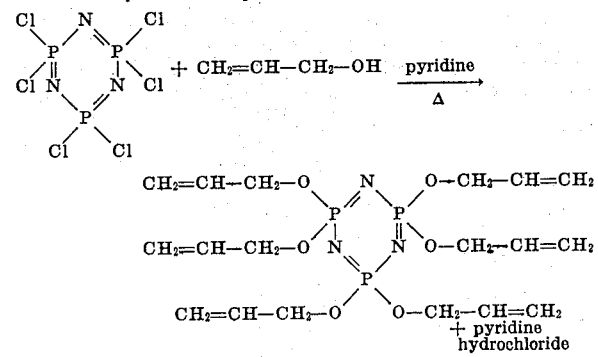

The same type of reaction can be achieved with linear polyphosphonitrilic chlorides. The polymers containing at least two reactive ene groups can be cured with polythiols. The cure is preferably achieved by exposure to ultraviolet radiation to form burn-resistant polymers. Examples of other useful alcohols having active ene groups which can be used in this type of reaction are oleyl alcohol, crotyl alcohol, 3-butene-1-ol, the cyclohexenols, etc. A solvent or reaction medium should be used.

Another process involves reacting cyclic or linear polyphosponitrilic chloride with a primary or secondary amine to replace all or part of the chlorine atoms. The primary amine is a compound of the type $RNH_2$, where R is an alkenyl group, such as, the allyl or crotyl group. Enough of the R's must have reactive ene groups. The process is illustrated as:

cyclo-$(PNCl_2)_3$ + 2tRNH$_2$ $\xrightarrow[35°C]{ether}$

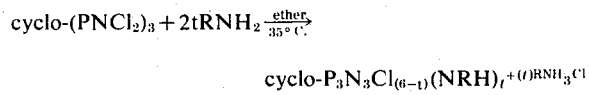

where t is 2 to 6. (A tertiary amine or a pyridine compound can be used to scavenger the HCl formed, instead of excess amine reactant, when the economic considerations warrant such usage.) The secondary amine is a compound of the type $NR_2H$, where R is an alkenyl group, such as, the allyl or crotyl group. At least two of the introduced R groups must have reactive ene groups. The process is illustrated as:

cyclo-$(PNCl_2)_3$ + excess $NR_2H$ $\xrightarrow[60°-120°C]{}$ cyclo-$P_3N_3Cl_{(6-t)}(NR_2)_t$ where t is 2 to 6. Similarly linear polyphosphonitrilic chloride can be reacted with primary or secondary amines of the above type to produce poly(alkenylamino)phosphazenes. This is the preferred method of introducing reactive ene groups into phosphonitrilic polymers.

Another process involves reacting linear or cyclic polyphosphonitrilic chlorides with polyols, such as, polyethylene glycol, polypropylene glycol, polyethylene propylene glycol, etc., in a solvent or reaction medium, such as, pyridine, which scavenges the HCl which is formed by the reaction. The cyclic polyphosphonitrilic chlorides form, for example:

$\{PN[OCH_2CH_2(OCH_2CH_2)_xOH]_2\}_y$

The linear and cyclic polymers containing the polyols can be reacted with diisocyanate so that the end —OH groups are converted to —NCO groups. The terminal —NCO groups are then reacted with unsaturated alcohols which have reactive ene groups. For example:

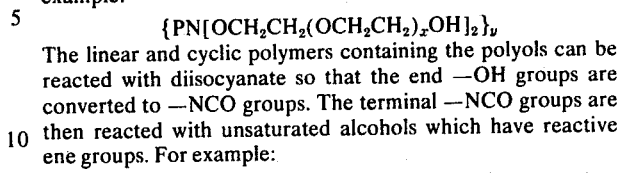
+ $CH_2=CH-CH_2-OH$ →

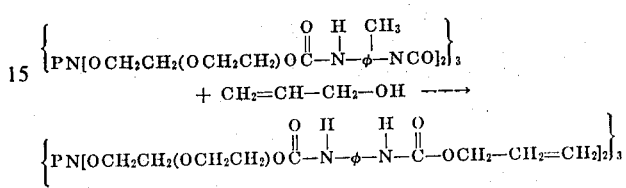

The polymer is then cured, i.e., polymerized by reaction with polythiols, to form flame-or burn-resistant polymers.

Another process involves reacting cyclic or linear polyphosphonitrilic chlorides with compounds having the general formula,

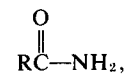
$RC-NH_2$, where R is an alkenyl group. At least two of the introduce R groups must have reactive ene groups. The process is illustrated as such:

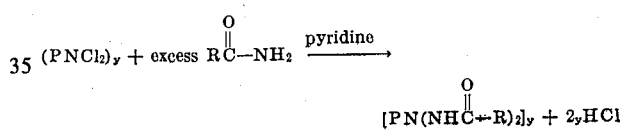

Another process involves reacting cyclic or linear polyphosphonitrilic chlorides with polyhydroxy compounds, such as, polyethylene glycol, polypropylene glycol, poly (prophylene-ethylene) glycol, etc. The resulting compound is then reacted with an alcohol having at least one reactive ene group. The process is illustrated as such:

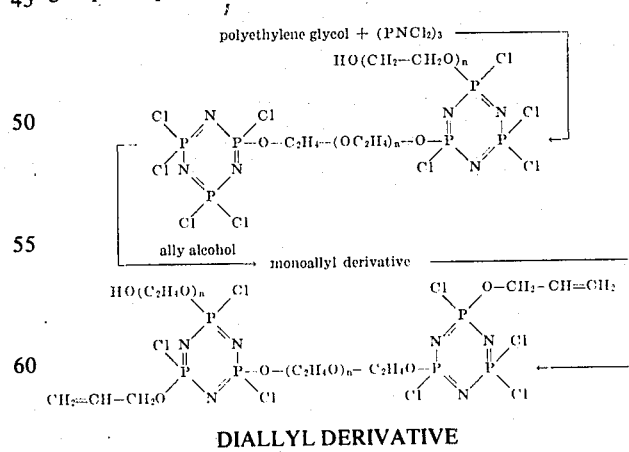

DIALLYL DERIVATIVE

If desired, all of the chlorines can be replaced with allyloxy groups in order to increase the unsaturated functionality of the material.

The conversion of the polyphosphonitrilic halides to the phosphonitrilic polymers containing at least two reactive ene groups is normally done in a solvent or reaction medium. If oxygen is present, organic solvents containing hydrogen should be avoided as the polyphosphonitrilic chloride tends to react with the organic solvents. The rate of reaction is fairly slow. No such reaction appears to occur when solvents devoid of active hydrogen in the molecule are used. Examples of such solvents are halogen-containing hydrocarbons, benzene; toluene; xylene; turpentine; saturated petroleum hydrocarbons; ethyl acetate; diethyl ether; cyclohexane; kerosene; etc. Solvents or media, such as, pyridine, triethylamine, tributylamine; etc., are useful in reactions where HCl is produced because that type of solvent scavenges the HCl.

The preferred method of curing the admixture of polythiol and phosphonitrilic polymer is to expose the admixture to actinic radiation containing substantial amounts of ultraviolet radiation. Useful ultraviolet (U.V.) radiation has a wave length in the range of about 2,000 to about 4,000 Angstrom units. Sunlight contains U.V. light but the length of exposure to obtain a photocure may be relatively long. Various light sources can be used to obtain U.V. light to practice the instant invention. Such sources include carbon arcs, mercury arcs, fluorescent lamps with special ultraviolet light emitting phosphors, xenon arcs, argon glow lamps, and photographic flood lamps. Of these, the mercury vapor arcs, particularly the sun-lamp type, and the xenon arcs are very useful. The sun-lamp mercury vapor arcs are at a distance of 7 to 10 inches from the photocurable material, whereas the xenon arc is placed at a distance of 24 to 40 inches from the photocurable material. With a more uniform extended source of low intrinsic brilliance, such as, a group of contiguous fluorescent lamps with special phosphors, the photocurable material can be exposed within an inch of the lamps.

The time required for exposure when a photocuring rate accelerator is present will range from a few seconds to several minutes or more depending on the intensity of the exposing radiation, the inherent photocuring rate of the composition, the curing temperature, the thickness of the photocurable material, and the structure and functionality of the polythiol and the phosphonitrilic polymer containing at least two reactive unsaturated carbon-to-carbon bonds. With insufficient exposure, the photocurable material may have a hard photocure at the surface but lack a clear-through photocure. Inasmuch as the photocuring rate usually increases at higher temperatures, less exposure is required thereat than at room temperature. Thus ultraviolet light sources that emit heat or the concurrent use of an infrared lamp with the U.V. lamp, etc., are more efficient than cold ultraviolet light sources. However, care must be exercised that too high a temperature is not attained during the photocure. Hence, it is preferred that the photocuring be carried out at a temperature in the range of about 20° to about 70°C.

The photocuring is not a true polymerization, but the terms "photocuring" and "polymerization" are used herein to cover what actually occurs. The photocuring reaction depends upon a condensation reaction of thiol groups with reactive ene groups, namely:

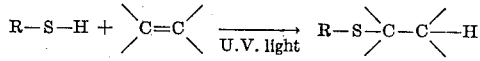

The photocuring reaction is initiated by ultraviolet light.

The speed of the photocuring reaction can be increased from days to within about 1 second to about minutes by the use of a chemical photocuring rate accelerator in an amount ranging from 0.0005 percent by weight to about 2.50 percent by weight of the polythiol and the phosphonitrilic polymer in the photocurable composition. Other terms for chemical photocuring rate accelerators are photoinitiators or photosensitizers, or photoactivators. Examples of useful chemical photocuring rate accelerators are benzophenone, acetophenone, acenapthene-quinone, methyl ethyl ketone, thioxanthen-9-one, 7-H-Benz [de] anthracen-7-one, dibenzosuberone, 1-naphthaldehyde, 4,4-bis(dimethylamino) benzophenone, fluorene-9-one, 1'-acetonaphthone, 2'-acetonaphthone, 2,3-butanedione, anthraquinone, 1-indanone, 2-tert-butyl anthroquinone, valerophenone, hexanophenone, 8-phenylbutryophenone, p-morpholinopropiophenone, 4-morpholinobenzophenone, 4'-morpholinodeoxybenzoin, p-diacetylbenzene, 4-aminobenzophenone, 4-methoxyacetophenone, benzaldehyde, α-tetralone, 9-acetyl-phenanthrene, 2-acetylphenanthrene, 10-thioxanthenone, 3-acetylphenanthrene, 3-acetylindole, 1,3,5-triacetylbenzene, etc. and the blends thereof.

Other methods of curing the admixtures of polythiol and phosphonitrilic polymers includes exposure to gamma rays, laser beams, electron beams, etc. The admixtures can also be cured by chemical means. Additions of the mecaptan functionalities to the ene groups has been known for over 20 years (Cheves Walling, "Free Radicals in Solution" John Wiley & Sons, Inc. 1950, New York, N. Y.) and it can be effected both by above described free-radical initiation by radiation procedures and by chemical methods of free-radical initiation. The chemical methods include the use of organic and inorganic peroxides, redox systems base on ferrous salts and peroxides, azocompounds, redox systems, metal salts such as hexacyanoferrate, h-quinone dioxime and its esters, etc. Such chemical initiators are useful when applications of the "mercaptan-olefin" addition type polymers are not amenable to radiation curing, e.g., in plywoods and other non-transparent uses. Organic peroxides which can be used are exemplified by t-butyl hydroperoxide, di-t-butyl peroxide, cumene hydroperoxide, pinane hydro-peroxide, pinene hydroperoxide, methylethyl ketone peroxide, acetyl peroxide, benzoyl peroxide, 2,5-dihexanoylperoxy-hexane, and the like. The inorganic peroxide initiators include $H_2O_2$, peroxy sulfates, peroxy phosphates and the like. Peroxide curing is normally done between 150° and 200°C. Redox systems and also azo compounds as free-radical initiators in the synthesis of elastomers and plastomers are discussed also in numerous publications including Cheves Walling local citation, and also Bovey, Koltoff, Medalia, and Meehan, "Emulsion Polymerization", Interscience Publishers, New York, N. Y. (1955). Diazo initiators include azorsobutylronitrile and azovaleronitrile, certain diazo ethers, dipheniftriazine, etc. Azo compound curing is normally achieved by the addition of heat.

The term "functionality" as used herein refers to the average number of reactive ene or thiol groups per molecule in the polyene or polythiol, respectively. For example, a phosphonitrilic polymer with an averabe of three "reactive" carbon-to-carbon unsaturated groups per molecule has a functionality (f) of three. A polymeric dithiol is a polythiol with an average of two thiol groups per molecule and thus has a functionality (f) of 2.

It is further understood and implied in the above definitions that is these systems, the functionality of the phosphonitrilic polymer and the polythiol component is commonly expressed in whole numbers although in practice the actual functionality may be fractional. For example, a polythiol having a nominal functionality of 2 (from theoretical considerations alone) may in fact have an effective functionality of somewhat less than 2. Preferably, the reaction components consisting of the phosphonitrilic polymer and polythiols of this invention generally are formulated in such a manner as to give solid, cross-linked, three dimensional network polythioether polymer systems on curing. In order to achieve such infinite network formation the individual phosphonitrilic polymers and polythiols must each have a functionality of at least 2 and the sum of the functionalities of the phosphonitrilic polymer and polythiol components must always be greater than 4. Blends and mixtures of the phosphonitrilic polymers and the polythiols containing said functionality are also operable herein.

To be slightly more specific, not all of the halogen atoms need be reacted or removed form the starting phosphonitrilic halide polymer. But at least two of the halogen atoms should be replaced by moieties containing reactive ene groups to permit polymerization (and cross-linking) via reactions with the polythiols.

As used herein, the terms "polyphosphonitrilic halides" and "phosphonitrilic halide polymers" encompass cyclic polymers of the class $(PNX_2)_y$, where $y$ is 3 to 17 and X is a halogen atom, and linear polymers of the class $X(PNX_2)_yPX_4$, where $y$ is at least one and X is a halogen atom. The term "phosphonitrilic polymers" encompasses the phosphonitrilic halide polymers which have two or more of the halogen atoms substituted with groups, which usually contain at least one reactive ene group.

The term "solution," as used herein, encompasses dispersions, solutions, suspensions, colloids, etc.

The following examples will aid in explaining, but should not be deemed as limiting, the instant invention. In all cases, unless otherwise noted, all parts and percentages are by weight.

EXAMPLE 1

3.5 grams of $(PNCl_2)_3$, 3.5 grams of allyl alcohol and 40 grams of pyridine were placed in a reaction vessel and stirred by means of a magnetic stirrer. The solution temperature rose instantly to 60°C. The solution was heated to boiling (above 110°C.) for 15 minutes. After heating, the solution separated into two layers. The solution was left standing for about 24 hours. The solution was heated, with stirring to 110°C. (reflux). The solution was cooled and diluted with 40 grams acetonitrile. The solution was left standing for another 24 hours and the solution was filtered and the precipitate was air dried. The dried solid weighed 4 grams. The filtrate was evaporated and about two grams of an opaque liquid polymer were recovered. 0.7 gram of the opaque liquid polymer were admixed with 0.8 gram of Q-43 and 0.003 gm. of dibenzosuberone. "Q-43" is the commercial designation of the tetraester of pentaerythritol and beta-mercaptopropionic acid and is commercially available from Carlisle Chemical Works (Cincinnati, Ohio) and Evans Chemetics Inc. (New York City). The mixture was photocured by exposure for 30 minutes to U.V. light (Black-Ray No. 22 gun manufactured by Ultraviolet Products, Inc., San Gabriel, Calif.) and a burn-resistant plastic resulted.

EXAMPLE 2

Example 1 was repeated, except that when the solid polymer (2 gm.) was admixed with 1.1 gm. of Q-43 and was exposed to the same U. V. light source for 30 minutes. The resultant cured plastic was burn-resistant by ASTM D-635.

EXAMPLE 3

Example 1 was repeated, except that the dibenzosuberone was left out of the formulation. The ultraviolet exposure took 8 hours to effect a photocure.

EXAMPLES 4 to 12

Example 1 was repeated nine times, except that the 3.5 gm. $(PNCl_2)_3$ was replaced with 3.5 gm. of $(PNCl_2)_4$, 3.5 gm. of linear hexamer of $(PNCl_2)$, 3.5 gm. of linear undecamer of $(PNCl_2)$, 2.5 gm. of $(PNF_2)_3$, 6.2 gm. of $(PNB_2)_4$, 3.95 gm. of $P_3n_3BrClb05$, 2.75 gm. of $P_4N_4Cl_2F_6$, 4.8 gm. of $Cl_3P = NPCl_2^-$  NPCl_4$, and 11.4 gm. of $Cl(PNCl_2)_8PCl_4$, respectively. Burn-resistant plastics were obtained.

EXAMPLE 13

Example 1 was repeated, except that 30 ml. of xylene were added to the photocurable mixture to reduce the viscosity of the mixture. A burn-resistant plastic was obtained.

EXAMPLE 14

Example 1 was repeated, except that the U.V. source was a 275 watt RS Westinghouse sunlamp held at a distance of 12 inches for 15 minutes. A burn-resistant plastic was obtained.

EXAMPLE 15

Example 1 was repeated, except that the dibenzosuberone was replaced with 0.15 gm. of benzophenone. A burn-resistant plastic was obtained.

EXAMPLES 16 to 18

Example 1 was repeated three times, except that the "Q-43" was replaced with 1.2 gm. of trimethylolpropane tris ($\beta$-mercaptopropionate), 1.0 gm. of pentaerythritol tetrakis (thioglycolate), and 0.5 gm. of ethylene glycol bis ($\beta$-mercaptopropionate), respectively. Burn-resistant plastics were obtained.

EXAMPLE 19

4 grams of polyethylene glycol (molecular weight about 400) was admixed with 3.6 gm. of cyclophosphonitrilic chloride trimer in 40 gm. of pyridine (dried over calcium hydride) and was heated to boiling. After cooling, 2.5 gm. of allyl alcohol (pre-dried silica gel) was added, and heating was continued at about 80°C. for 45 minutes. The mixture was diluted with 40 gm. of acetonitrile, and the lower polymer layer was separated by decanting the upper solvent layer. The weight of separated polymer was four grams. Two grams of the polymer was added to 1.1 gm. of Q-43 and 0.006 gm. of dibenzosuberone (light sensitizer). The mixture at 100°C. under U.V. light (Black-Ray No. 22, Ultraviolet Prod., Inc., San Gabriel, Calif.) was converted to a yellow hard brittle polymer in 30 minutes. It was self-extinguishing in 2 to 3 seconds after 30 seconds ignition time (ASTM D-635). The decanted upper layer from the polymer was evaporated to obtain 5 grams of liquid polymer; 1.5 gm. of this polymer was mixed with 1 gm. of Q-43 and a few drops of t-butyl-hydroperoxide (50 percent). The mixture was placed in an oven at 105°C. for 18 hrs. The mixture cured to a yellow resilient polymer which was self-extinguishing after 15 seconds ignition time.

This plastic comprises ally substituted $[PN(Cl)_2]_3$ moieties bound together by polyoxyethylene linkages, and cross-linked via the addition reaction of the polymercaptan (Q-43) with the ally groups of the ally-substituted $PNCl_2$ moieties.

EXAMPLE 20

Polyethylene glycol (4.0gm.) of about 400 molecular weight was well mixed with 3.5 gm. of cyclo tetraphosphonitrilic chloride and 2.52 gm. allyl alcohol in 40 gm. pyridine. The glycol and allyl alcohol had been pre-dried with silica gel, and the pyridine had been pre-dried with calcium hydride. The mixture was heated to reflux for 2.5 hours. A lower layer (6 gm.) was separated and combined with 0.5 percent benzophenone. A part of this mixture was exposed to bright noon-day sunlight for 1 hour to produce a cured hard plastic.

Another portion when exposed to U.V. light produced by a 275 watt RS Westinghouse sunlamp for five minutes at a distance of 12 inches was converted into a hard plastic.

EXAMPLE 21

Example 19 was repeated, except that the polyethylene glycol was replaced with 30 gm. of a polypropylene glycol having a molecular weight of 2,960 and available under the trade name "Triol 3000" from Union Carbide Corp. A burn-resistant plastic was obtained.

Example 22

The final mixture of Example 1 (before being photocured) was spread (about 4 mils thick) on a 5 mil thick sheet of Mylar. The mixture was exposed to a laser beam (mfged. by Applied Laser Co.; Argan Laser; Blue-green 4,600°–4,800°A, max. power—1 to 2 watts; beam diameter—3 mm.) for 2 minutes. A burn-resistant plastic resulted in the exposed areas.

Example 23

Example 22 was repeated, except that the Q—43 was left out of the exposed mixture. The exposure was for 15 minutes and the cure was poor, but a burn-resistant plastic resulted in the exposed areas.

What is claimed is:

1. A process for preparing a burn-resistant polymer, said process comprising:
   a. preparing a curable mixture by admixing
      1. a polythiol containing at least two thiol groups per molecule, and
      2. a phosphonitrilic polymer containing at least two reactive ene groups formed by reacting a member of the group consisting of a cyclic phosphonitrilic halide polymer of the class $(PNX_2)_y$, where $y$ is 3 to 17 and X is a halogen atom, and a linear phsophonitrile/halide polymer of the class $X(PNX_2)_yPX_4$, where $y$ is at least one and X is a halogen atom, with moieties containing at least two reactive ene groups, wherein the sum of the functionalities of (1) and (2) is at least 4; and
   b. curing said curable mixture, whereby (1) and (2) are converted to a solid burn-resistant polymer.

2. A process for preparing a burn-resistant polymer, said process comprising:
   a. preparing a photocurable mixture by admixing
      1. a polythiol containing at least two thiol groups per molecule, and
      2. a phosphonitrilic polymer containing at least two reactive ene groups formed by reacting a member of the group consisting of a cyclic phosphonitrilic halide polymer of the class $(PNX_2)_y$, where $y$ is 3 to 17 and X is a halogen atom, and a linear phosphonitrile/halide polymer of the class $X(PNX_2)_yPX_4$, where $y$ is at least one and X is a halogen atom, with moieties containing at least two reactive ene groups,
      wherein the sum of the functionalities of (1) and (2) is at least four; and
   b. exposing said photocurable mixture to actinic radiation containing a substantial amount of ultraviolet radiation, whereby (1) and (2) are converted to a solid burn-resistant polymer.

3. A process as described in claim 2 wherein the photocuring is achieved at a temperature between about 20° and about 70°C.

4. A process as described in claim 2 wherein said polythiol has a molecular weight between about 50 and about 20,000; and has a viscosity between slightly above 0 and about 20,000,000 centipoises at 70°C.

5. A process as described in claim 2 wherein said polythiol has a molecular weight in excess of 300.

6. A process as described in claim 2 wherein said photocurable mixture is comprised of 2 to 98 parts by weight of said polythiol and 98 to 2 parts by weight of said phosphonitrilic polymer.

7. A process as described in claim 2 wherein the sum of the functionalities of said polythiol and said phosphonitrilic polymer is greater than 4.

8. A process as described in claim 2 which includes the step of converting a phosphonitrilic halide polymer into said phosphonitrilic polymer containing at at least two reactive ene groups.

9. A process as described in claim 2 which includes the step of converting a phosphonitrilic chloride polymer into said phosphonitrilic polymer containing at least two reactive ene groups.

10. A process as described in claim 2 which includes the step of converting a cyclic phosphonitrilic chloride polymer into said phosphonitrilic polymer containing at least two reactive ene groups.

11. A process as described in claim 10 wherein said cyclic phosphonitrile chloride polymer is reacted with a compound selected from the class consisting of a secondary amine containing at least one reactive ene group and a primary amine containing a reactive ene group, whereby said phosphonitrilic polymer containing at least two reactive ene groups is formed.

12. A process as described in claim 10 wherein said cyclic phosphonitrilic chloride polymer is reacted with an alcohol containing at least one reactive ene group in the presence of a solvent, whereby said phosphonitrilic polymer containing at least two reactive ene groups is formed.

13. A process as described in claim 10 wherein said cyclic phosphonitrilic chloride polymer is reacted with a compound having the general formula,

wherein R contains at least one reactive ene group, in the presence of a solvent, whereby said phosphonitrilic polymer contains at least two reactive ene groups is formed.

14. A process as defined in claim 10 wherein a solvent reaction system is used.

15. A process as described in claim 14 wherein the solvent is pyridine.

16. A process as described in claim 2 wherein up to about 0.0005 to 25.0 parts by weight of a chemical photocuring rate accelerator is included, said parts by weight being based upon 100 parts by weight of said polythiol and said phosphonitrilic polymer.

17. A burn-resistant polymer comprised of a solidified cured composition which was formed by curing an admixture of (a) a polythiol containing at least two thiol groups per molecule and (b) a phosphonitrilic polymer containing at least two reactive ene groups per molecule, formed by reacting a member of the group consisting of a cyclic phosphonitrilic halide polymer of the class $(PNX_2)_y$, where $y$ is 3 to 17 and X is a halogen atom, and a linear phosphonitrile/halide polymer of the class $X(PNX_2)_yPX_4$, where $y$ is at least one and X is a halogen atom, with moieties containing at least two reactive ene groups wherein the sum of the functionalities of said polythiol and phosphonitrilic polymer is at least 4.

18. A burn-resistant polymer comprised of a solidified photocured composition which was formed by exposure to actinic radiation containing substantial amounts of ultraviolet radiation of an admixture of (a) a polythiol containing at least two thiol groups per molecule and (b) a phosphonitrilic polymer containing at least two reactive ene groups per molecule, formed by reacting a member of the group consisting of a cyclic phosphonitrilic halide polymer of the class $(PNX_2)_y$, where $y$ is 3 to 17 and X is a halogen atom, and a linear phosphonitrile/halide polymer of the class $X(PNX_2)_yPX_4$, where $y$ is at least one and X is a halogen atom, with moieties containing at least two reactive ene groups wherein the sum of the functionalities of said polythiol and said phosphonitrilic polymer containing more than two reactive ene groups is at least 4.

* * * * *